(12) United States Patent
Laskowski et al.

(10) Patent No.: US 8,892,457 B2
(45) Date of Patent: Nov. 18, 2014

(54) VEHICLE LOCK BOX

(75) Inventors: Edward Paul Laskowski, Montgomery, TX (US); Jason Glen Squier, Cleveland, TX (US)

(73) Assignee: Laskowski & Squier, LLC, Livingston, TX (US)

( * ) Notice: Subject to any disclaimer, the term of this patent is extended or adjusted under 35 U.S.C. 154(b) by 1275 days.

(21) Appl. No.: 12/399,660

(22) Filed: Mar. 6, 2009

(65) Prior Publication Data

US 2010/0228666 A1    Sep. 9, 2010

(51) Int. Cl.
*G07B 15/02* (2011.01)

(52) U.S. Cl.
USPC ............................................. 705/13; 109/73

(58) Field of Classification Search
CPC .............................. G07B 15/02; G07B 15/063
USPC ............. 705/35, 39, 44, 13; 109/73; 414/233; 340/932.2
See application file for complete search history.

(56) References Cited

U.S. PATENT DOCUMENTS

| | | | |
|---|---|---|---|
| 3,281,998 A | | 11/1966 | Honold et al. |
| 4,325,146 A | * | 4/1982 | Lennington ................. 398/108 |
| 4,574,523 A | * | 3/1986 | Nasatka ........................ 49/49 |
| 4,664,580 A | * | 5/1987 | Matoba ........................ 414/228 |
| 4,894,654 A | * | 1/1990 | Serenbetz ................. 340/932.2 |
| 4,990,757 A | * | 2/1991 | Edwards et al. ............. 235/384 |
| 5,036,634 A | | 8/1991 | Lessard et al. |
| 5,266,947 A | * | 11/1993 | Fujiwara et al. ........... 340/932.2 |
| 5,386,788 A | | 2/1995 | Linker et al. |
| 6,701,678 B1 | | 3/2004 | Skov et al. |
| 6,901,708 B1 | | 6/2005 | Powers, III |
| 2003/0075287 A1 | * | 4/2003 | Weik, III ........................ 160/133 |
| 2003/0098774 A1 | * | 5/2003 | Chornenky .................... 340/5.1 |
| 2003/0179107 A1 | * | 9/2003 | Kibria et al. ............... 340/932.2 |
| 2004/0213399 A1 | * | 10/2004 | Nelson et al. ............ 379/265.05 |
| 2004/0237439 A1 | * | 12/2004 | Powell ........................... 52/505 |
| 2005/0033835 A1 | | 2/2005 | Kinjo |
| 2005/0205218 A1 | | 9/2005 | Snyder et al. |
| 2006/0015398 A1 | * | 1/2006 | Weik, III .......................... 705/13 |
| 2006/0157206 A1 | * | 7/2006 | Weik et al. ..................... 160/188 |
| 2006/0191209 A1 | | 8/2006 | Reisman |
| 2006/0220842 A1 | | 10/2006 | Breed |
| 2008/0034680 A1 | | 2/2008 | Tucker et al. |

FOREIGN PATENT DOCUMENTS

| | | |
|---|---|---|
| JP | 2002038748 A | 2/2002 |
| JP | 2002271869 A | 9/2002 |
| JP | 2004108041 A | 4/2004 |
| KR | 1998016835 | 6/1998 |

OTHER PUBLICATIONS

PCT/US2009/050454 International Search Report and Written Opinion, Mar. 9, 2010.

* cited by examiner

*Primary Examiner* — Lindsay M. Maguire
(74) *Attorney, Agent, or Firm* — Conley Rose, P.C.

(57) ABSTRACT

A relocatable and remotely actuatable vehicle security system. In some embodiments, the vehicle security system includes a relocatable structure forming an enclosure over a parking surface and an electronic actuation system. The relocatable structure has a closeable opening through which a vehicle enters and leaves the enclosure. The electronic actuation system is configured to actuate a drive mechanism to close the opening or to expose the opening upon receipt of a remotely generated signal.

14 Claims, 11 Drawing Sheets

VEHICLE LOCK BOX

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to security systems for automotive vehicles. More particularly, the present invention relates to relocatable enclosures that are remotely actuatable to open to receive a vehicle and to subsequently close to secure the vehicle.

Each year in the United States, there are hundreds of thousand of cars and trucks reported stolen. Also, more than 500,000 break-ins of cars and trucks occur. The number of thefts and break-ins represent significant monetary damages to the vehicle owners. In response to these growing statistics, various types of vehicle security systems have been developed. For example, many new cars and trucks are purchased with an installed alarm system. Alternatively, alarm systems are also available for aftermarket purchase and installation on virtually any vehicle. In the event that an unauthorized individual attempts to enter a vehicle having an alarm system, the alarm is triggered and begins to emit a high-volume sound and/or produce flashing lights, both designed to draw attention to the vehicle and thus scare off the would-be thief or vandal.

Alternatively, or additionally, a vehicle may be equipped with a car immobilizer. These systems typically do not emit sound or produce flashing lights. Instead, these systems are configured to prevent the vehicle from being operational. One well-known example of an immobilizer is a steering wheel lock known as THE CLUB. Once such an immobilizer is locked about the steering wheel of a vehicle, the steering wheel cannot be turned; thus, the vehicle remains inoperable until THE CLUB is unlocked and removed. Another type of immobilizer is a "starter kill," which simply prevents the vehicle from starting without insertion of the appropriate key into the vehicle's ignition.

There are other types of vehicle systems that do not prevent theft of the vehicle but rather enable recovery of the stolen vehicle. Perhaps the most well-known recovery system is the LOJACK system. This system includes a transmitter that may be hidden within a vehicle. After the vehicle is stolen, the transmitter may be activated to emit a signal, which can be tracked by law enforcement authorities having the appropriate equipment to locate and recover the vehicle. As another example, a global positioning system (GPS) may be installed in a vehicle. The GPS enables satellite tracking of the vehicle, including the state of the vehicle's operation and its location in the event the vehicle is stolen.

Car alarm systems and vehicle recovery systems do not prevent unauthorized entry to the vehicle, damage to the vehicle during and subsequent to entry, or theft of the vehicle, including its contents. Although car immobilizers may prevent theft of the vehicle, these devices also do not prevent unauthorized entry, damage, or theft of the vehicle's contents. Accordingly, there exists a need for a vehicle security system that prevents unauthorized entry, vandalism, and/or theft of a vehicle or its contents.

SUMMARY OF THE PREFERRED EMBODIMENTS

Systems and methods for securing a vehicle are disclosed. In some embodiments, the vehicle security system, known as a vehicle lock box, includes a relocatable structure forming an enclosure over a parking surface and an electronic actuation system. The relocatable structure has a closeable opening through which a vehicle enters and leaves the enclosure. The electronic actuation system is configured to actuate a drive mechanism to close the opening or to expose the opening upon receipt of a remotely generated signal.

Some methods for securing the vehicle within the vehicle lock box include requesting access to the vehicle lock box, transmitting a first signal to the electronic actuation system, retracting a door covering the closeable opening upon receipt of the first signal, driving a vehicle through the closeable opening into the enclosure, transmitting a second signal to the electronic actuation system, and extending the door to cover the closeable opening and enclose the vehicle within the vehicle lock box upon receipt of the second signal.

Some methods for renting the vehicle lock box include receiving a request for access to the vehicle lock box, receiving payment information, transmitting a first signal to the electronic actuation system, retracting a door covering the closeable opening upon delivery of the first signal, transmitting a second signal to the electronic actuation system, and extending the door to cover the closeable opening and enclose the vehicle within the vehicle lock box upon delivery of the second signal.

In other embodiments, the vehicle security system includes an enclosure formed by a multi-walled structure positioned on a parking surface and configured to receive a vehicle therein, the enclosure having an closeable opening through which the vehicle is accessible, an attendant system remotely located from the enclosure and configured to control access to the vehicle through the opening, and an electronic actuation system configured to receive a first signal from the attendant system and to deliver a second signal, whereby the opening is covered or exposed.

Thus, the vehicle lock box and associated systems and methods comprise a combination of features and advantages that enable it to prevent unauthorized access, vandalism, and theft of a vehicle or its contents. These and various other characteristics and advantages of the preferred embodiments will be readily apparent to those skilled in the art upon reading the following detailed description and by referring to the accompanying drawings.

BRIEF DESCRIPTION OF THE DRAWINGS

For a more detailed understanding of the preferred embodiments, reference is made to the accompanying Figures, wherein.

NOTATION AND NOMENCLATURE

Certain terms are used throughout the following description and claims to refer to particular system components. This document does not intend to distinguish between components that differ in name but not function. Moreover, the drawing figures are not necessarily to scale. Certain features of the invention may be shown exaggerated in scale or in somewhat schematic form, and some details of conventional elements may not be shown in the interest of clarity and conciseness.

In the following discussion and in the claims, the term "comprises" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
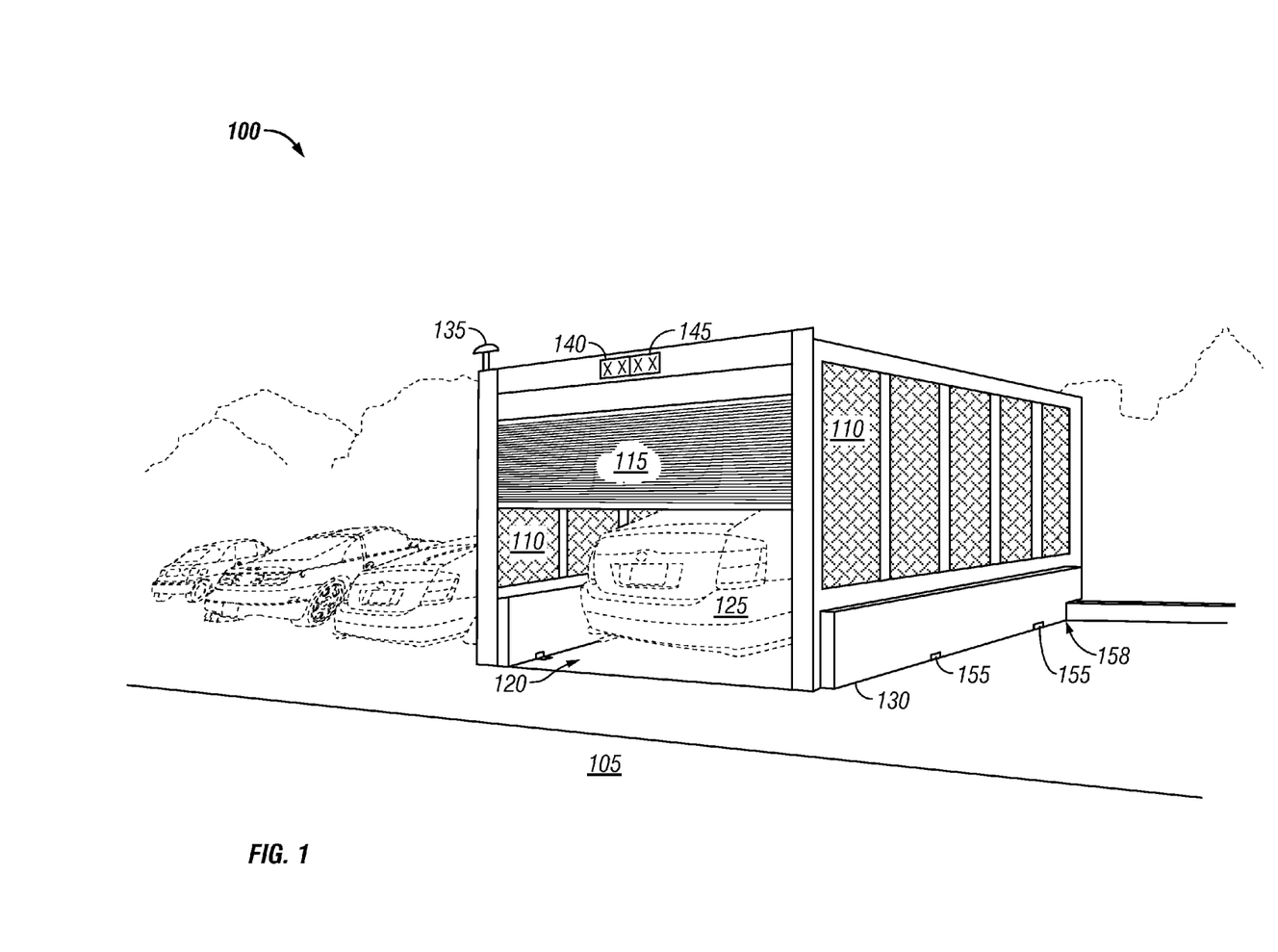
FIG. 1 is a perspective view of a schematic representation of a vehicle lock box in accordance with the principles disclosed herein.

Referring to FIG. 1, there is shown a perspective view of an embodiment of a vehicle security system 100, referred to herein as a lock box, installed and operational within a parking lot 105 adjoining a residential apartment complex. Lock box 100 includes two side-walls 110, an entry 115, a rear wall, and a roof (the latter two not visible in this figure), all of which together form an enclosure 120 over parking lot 105 configured to receive and enclose a vehicle 125 therein. Entry 115 is actuatable to open, thereby enabling vehicle 125 to enter enclosure 120, as illustrated, and to subsequently close, thereby securing vehicle 125 within enclosure 120.

As will be described in greater detail below, lock box 100 is configured to prevent access to vehicle 125 through means typically employed by vandals and thieves. For instance, lock box 100 does not include an external lock, which, when picked or broken, enables entry 115 to open. The mechanism for opening entry 115 is contained within lock box 100 and inaccessible from outside of enclosure 120. Also, sidewalls 110 and the rear wall are constructed from materials that are resistive to penetration; their coupling means, too, are inaccessible from outside of enclosure 120. Unlike conventional vehicle security systems described above, lock box 100 prevents any direct contact between vehicle 125 and would-be vandals and thieves, thereby eliminating the opportunity for damage to or theft of vehicle 125 and its contents.

In FIG. 1, vehicle 125 is a car. Lock box 100 is accordingly sized to receive and secure car 125 therein, as well as to have a footprint 130 that enables lock box 100 to occupy minimal space within parking lot 105, or other installation site. In some embodiments, lock box 100 includes a curb recess 158 proximate its rear wall to enable lock box 100 to occupy minimal space within parking lot 105. Curb recess 158 is configured to receive a curb in parking lot 105, as shown, thereby enabling lock box 100 to be positioned flush against the curb.

Lock box 100 is also configured to be relocatable, either to another location within parking lot 105 or another installation site altogether. To enable its relocation, lock box 100 includes external features 155 that enable lifting of lock box 100. In this embodiment, each feature 155 is an opening along the base of a sidewall 110 configured to receive the fork of a fork lift. Further, features 155 enable water, such as rain water or melted snow, to pass therethrough to prevent its buildup within auto lock box 100.

To enable access of lock box 100 by an authorized user, lock box 100 further includes an electronic actuation system (EAS) 135, a unique identifier or number 140, and a telephone number 145. In this embodiment, EAS 135 is installed on the roof of lock box 100 proximate entry 115. EAS 135 includes a receiver configured to receive a signal transmitted from a remote location and a transmitter configured to deliver a signal to a drive mechanism coupled to entry 115. Upon receipt of the signal, the drive mechanism is actuated to open or close entry 115, as desired. Identifier 140 and telephone number 145 are displayed proximate entry 115 and enable a user to gain access to lock box 100.

In at least some embodiments, lock box 100 further includes an anchor or tie-down system 150 to secure lock box 110 in position. Anchor system 150 is coupled between sidewalls 110 and the asphalt, cement, or other material forming parking lot 105. Once installed, anchor system 150 prevents movement of lock box 100 relative to vehicle 125 stored therein due to environmental loads, such as wind, and impacts loads, such as contact loads resulting from another vehicle unintentionally backing into lock box 100. In this embodiment, anchor system 150 includes two wedge plates, each of which is bolted to a sidewall 110 and bolted to parking lot 105. In other embodiments, anchor system 150 may include only one—or more than two—wedge plates similarly coupled between a sidewall 110 and parking lot 105. Moreover, anchoring system 150 may alternatively include other equivalent anchoring means coupling lock box 100 to parking lot 105.

Prior to use, the individual components of lock box 100 are delivered to parking lot 105, where they are assembled in the desired location to form enclosure 120, as shown. After assembly, lock box 100 is then secured in place by installation of anchor system 150. Once assembled, an individual entering parking lot 105 and wishing to access lock box 100 to secure a vehicle, such as vehicle 125, therein, simply calls telephone number 145 via his or her phone, informs the answering attendant that the user wishes to access lock box 100 corresponding to identifier 140. The attendant verifies that lock box 100 is empty, and thus available for rental, and then takes personal information identifying the user and payment information, such as credit card number, from the user.

After the attendant verifies payment information provided by the user, the attendant activates a system to transmit a signal to lock box 100, where the signal is received by EAS 135. Upon receipt of the signal, entry 115 is opened. The user then drives vehicle 125 into enclosure 120, parks vehicle 125, and exits lock box 100. When the user has exited lock box 100 and is clear of entry 115, the attendant transmits a second signal to lock box 100, where the signal is received by EAS 135, and entry 115 is closed, thereby securing vehicle 125 and its contents within lock box 100.

Later, when the user returns to lock box 100 to access or retrieve vehicle 125, the user again calls telephone number 145, provides the answering attendant with information identifying the user, and then requests access to vehicle 125. Upon verification of the user's identity, the attendant again transmits a signal to lock box 100 to open entry 115. The user then accesses or retrieves vehicle 125 from lock box 100. After the user accesses or removes vehicle 125, the attendant transmits a signal to lock box 100 to close entry 115. In the event the user has removed vehicle 125 from lock box 100, the user is charged a rental fee corresponding to the amount of time vehicle 125 was secured within lock box 100. Otherwise, for example, the user accesses vehicle 125 but leaves vehicle 125 within lock box 100, rental fees continue to accumulate to the user until the user finally retrieves vehicle 125 from lock box 100.

In this exemplary embodiment, the user is provided with access to lock box 100 via communication with an attendant monitoring telephone number 145 displayed on entry 115 of lock box 100. In other embodiments, the attendant may be replaced with an automated system configured to receive information provided by the user via the keypad of his telephone and to transmit signals to EAS 135 of lock box 100, as appropriate. Otherwise, operation of lock box 100 remains substantially the same.

Further, lock box 100 is illustrated as sized to receive and secure a car. In other embodiments, lock box 100 may be configured to receive and secure other vehicles, such as a truck, as described below, motorcycle, or boat on a trailer, and equipment, such as that commonly used at a construction site. Although these embodiments secure different types of vehicles or equipment, they function and operate substantially the same as described above.

Figure 2:
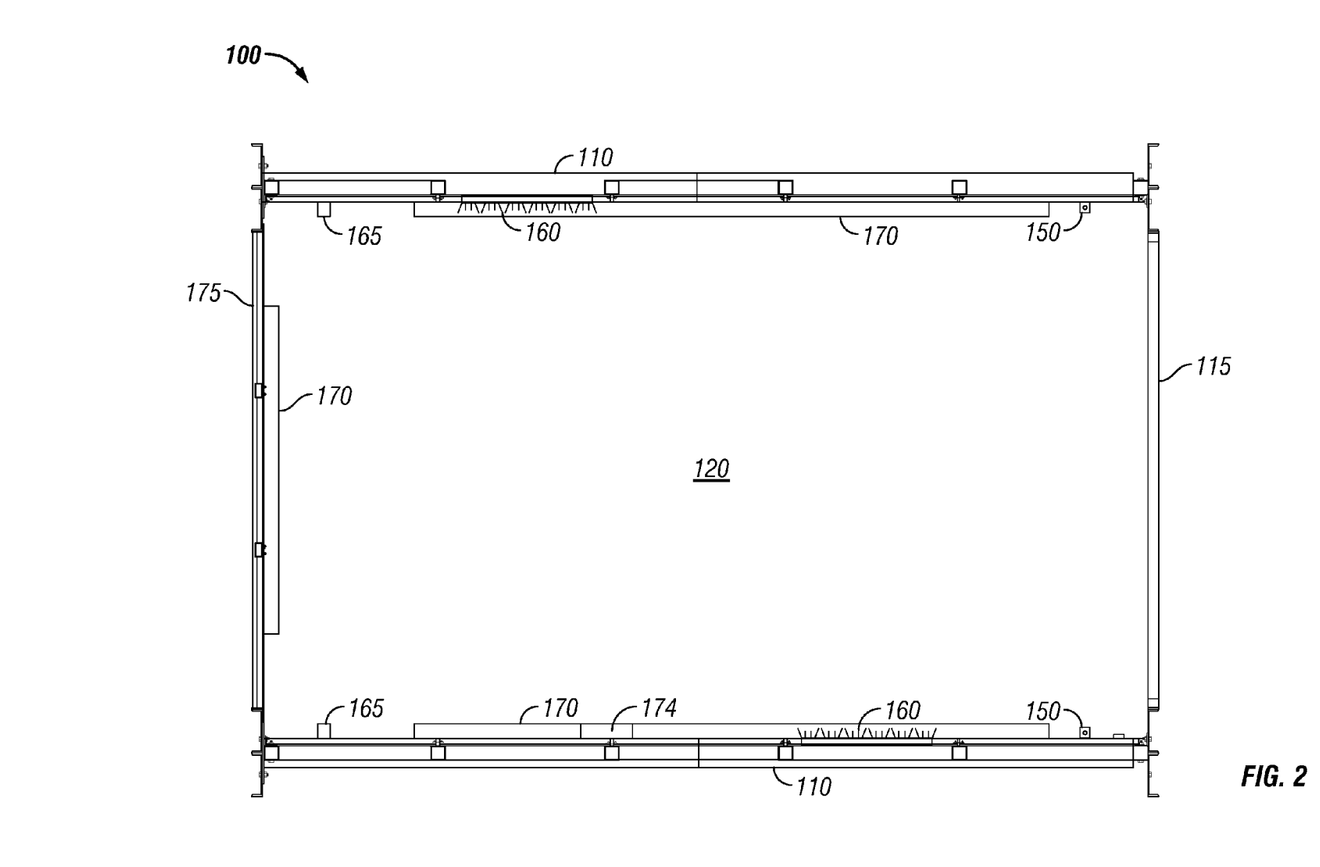
FIG. 2 is a plan view of the auto lock box of FIG. 1, illustrating the lock box interior.

Turning now to FIG. 2, a plan view of lock box 100, or auto lock box 100, is shown, illustrating the interior features of enclosure 120. Auto lock box 100 further includes one or more lighting panels 160, electrical outlets 165, and bumper guards 170. Lighting panels 160 may be positioned along any or all of sidewalls 1 10 and rear wall 175 to provide illumination for the user's convenience and/or security. Lighting panels 160 may be configured to operate by manual actuation of a switch by the user, or to automatically turn on and off when entry 115 is opened and closed, respectively. Electrical outlets 165 may also be positioned along any or all of sidewalls 110 and rear wall 175 to enable the user to charge vehicle 125 (FIG. 1), in the case where vehicle 125 is an electric car, and/or electronic devices, such as a cellular phone. Bumper guards 170 may be positioned along any or all of sidewalls 110 and rear wall, and are configured to prevent damage, such as door dings, when the front end or doors of vehicle 125 inadvertently contact auto lockbox 100.

To provide electrical power to lighting panels 160 and electrical outlets 165, as well as EAS 135 and the drive mechanism coupled to entry 115, lock box 100 further includes an electrical panel 174 mounted within enclosure 120. In this embodiment, electrical panel 174 is mounted to a sidewall 110 just below one of lighting panels 170. Panel 174 is electrically coupled to lighting panels 160, electrical outlets 165, EAS 135, and the drive mechanism. Panel 174 is also electrically coupled to a power source in proximity to parking lot 105. For example, the power source may be embedded within the surface of parking lot 105 over which lock box 100 is assembled. Regardless of the location of the power source, electricity is supplied by the power source through electrical panel 174 to lighting panels 160, electrical outlets 165, EAS 135, and the drive mechanism. In at least some embodiments, the user may incur an additional fee corresponding to power consumption resulting from use of lighting panels 160, electrical outlets 165, EAS 135, and/or the drive mechanism during the time vehicle 125 is secured within lock box 100.

Figure 3:
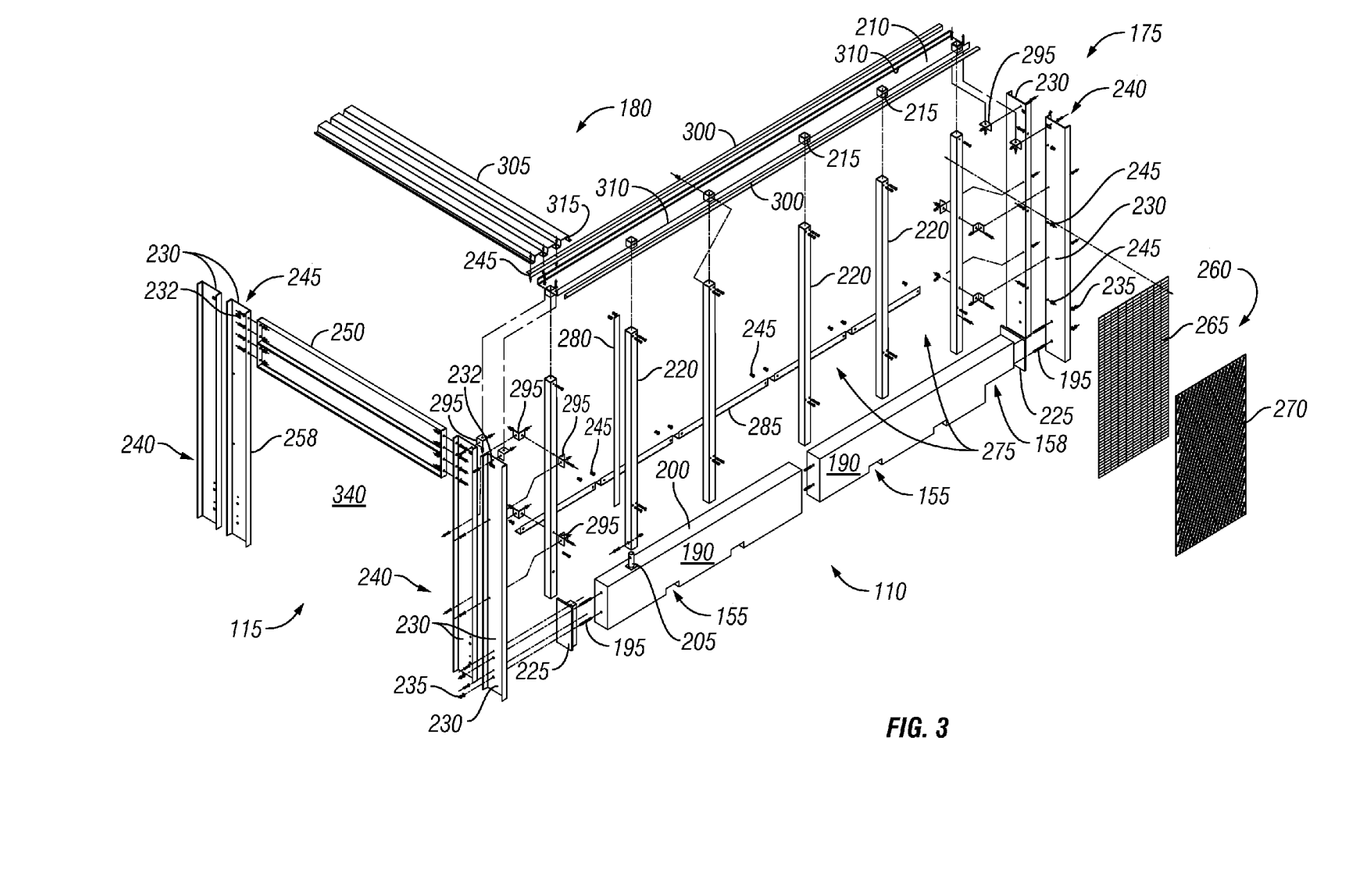
FIG. 3 is an exploded view of the entry and a sidewall of the auto lock box.

Referring next to FIG. 3, an exploded assembly view of one sidewall 110, entry 115, and roof 180 of auto lock box 100 is shown. In this embodiment, construction of each sidewall 110 and its coupling to entry 115, rear wall 175, and roof 180 are substantially identical. Thus, the following description, which is directed to the sidewall 110 depicted in FIG. 3, applies equally to the other sidewall 1 10, which is not shown in FIG. 3.

The base of sidewall 110 is formed by two pre-cast concrete blocks 190 that are rectangular in shape and coupled end-to-end by two tensile rods 195 extending therebetween. Blocks 190 provide stability and ballast to auto lock box 100. Each block 190 includes one or more features 155, and the block 190 proximate rear wall 175 further includes curb recess 158. Both features 155 and curb recess 158 were previously described above. Although each sidewall 110 includes two concrete blocks 190 in this embodiment, the sidewalls of other embodiments may include only one—or more than two—concrete blocks 190. By varying the number of blocks 190 and/or their dimensions, the overall length of auto lock box 100 can be configured as desired. 100421 Along the upper surface 200 of each block 190, there are a plurality of inserts 205 (only one is illustrated) extending therefrom. Adapter plate 210, which forms a portion of roof 180, similarly includes a plurality of extensions 215 extending therefrom. Adaptor plate 210 and blocks 190 are configured to enable each extension 215 of adapter plate 210 of roof 180 to laterally align with one insert 205 of a block 190. A support tubular 220 extends between each insert 205 and extension 215, such that the upper and lower ends of support tubular 220 receive extension 215 and insert 205, respectively, therein. By varying the length of support tubulars 220, the overall height of auto lock box 100 can be configured as desired. Support tubulars 220 and concrete blocks 190 coupled thereto of both sidewalls 110 support the weight of roof 180, the drive mechanism that opens and closes entry 115, which is described below, and the remaining components of sidewalls 110 coupled thereto.

A face plate 225 is disposed between the free end of each block 190 and a vertically extending channel plate 230. Channel plate 230 is coupled to block 190 with face plate 225 positioned therebetween by a plurality of tensile rods 195 and fastening means 235 coupled thereto. In this embodiment, each tensile rod 195 is threaded at its end distal from concrete blocks 190, and each fastening means 235 is a nut threaded thereto. However, in other embodiments, channel plate 230 may be coupled to block 190 with face plate 225 positioned therebetween using another type of equivalent coupling means known in the industry. Channel plate 230 includes an opening 232 (also shown in FIG. 5) extending therethrough proximate its upper end. Opening 232 is configured to enable drainage of water from adaptor plate 210 of roof 180 due to rain and/or snow. In some embodiments, opening 232 is three inches in length by one inch in height.

Adjacent each channel plate 230 is another similarly oriented channel plate 230. Thus, there are two pairs 240 of channel plates 230 between which concrete blocks 190 extend. Each pair 240 of channel plates 230 is coupled by a plurality of coupling members 245 extending therebetween. In this embodiment, each coupling member 245 includes a bolt and nut threaded thereto. In other embodiments, however, coupling member 245 may include another type of equivalent coupling means known in the industry.

Each pair 240 of channel plates 230 is also coupled to the adjacent support tubular 220 by four angle clips 295 and a plurality of coupling members 245. At the lower end of the support tubular 220, one angle clip 295 is positioned between the exterior surface, defined relative to enclosure 120, of support tubular 220 and the interior surface of the outermost channel plate 230. Another angle clip 295 is positioned between the interior surface of support tubular 220 and the interior support of the innermost channel plate 230. The angle clips 295 are secured in position by three coupling members 245: one extending between the external clip 295 and the outermost channel plate 230, another extending between the internal clip 295 and the innermost channel plate 230, and the last extending through the internal clip 295, support tubular 220, and the external clip 295. The upper end of the support tubular 220 is similarly coupled to channel plates 230 by four more angle clips 295 and additional coupling members 245. In other embodiments, each pair 240 of channel plates 230 may be coupled to the adjacent support tubular 220 using fewer or more angle clips and coupling members 245 and/or other equivalent types of coupling means known in the industry.

Each pair 240 of channel plates 230 is also coupled to adaptor plate 210 of roof 180 by two angle clips 295 and a plurality of coupling members 245. One angle clip 295 is coupled between the interior surface of one channel plate 230 and the lower surface of adaptor plate 210 by two coupling members 245, one extending between the channel plate 230 and the angle clip 295, and the other extending between adaptor plate 210 and the angle clip 295. Another angle clip 295 is similarly coupled between the other channel plate 230 and adaptor plate 210. In other embodiments, each pair 240 of channel plates 230 may be coupled to adaptor plate 210 of roof 180 using fewer or more angle clips and coupling members 245 and/or other equivalent types of coupling means known in the industry.

To complete sidewall 110, a skin 260 is coupled thereto. Skin 260 is resistive to penetration, cutting, and/or other destructive action which would result in an opening through skin 260 to the interior of lock box 100. In this embodiment, skin 260 includes a layer of wirewall 265 and an adjacent layer of perforated metal plate panel 270. In other embodiments, skin 260 may include one or the other. Moreover, varied combinations of wirewall 265 and plate panel 270 may be coupled to different portions of sidewall 110 in still other embodiments. Wirewall 265 and plate panel 270 are both perforated, or grated, to enable sunlight and air to pass therethrough, thereby promoting the security and ventilation of auto lock box 100.

An opening 275 is formed between each adjacent pair of support tubulars 220, concrete block 190, and roof 180. Skin 260 extends across each opening 275 and is coupled to support tubulars 220, thereby covering opening 275 and preventing access therethrough into auto lock box 100. Sidewall 110 further includes a pair of vertically extending support members 280 and an angle iron 285 extending therebetween to enable coupling of skin 260 to support tubulars 220 over each opening 275.

To cover opening 275, skin 260 is positioned against the interior surfaces of support tubulars 220. Next, one support member 280 is positioned against each support tubular 220 with skin 260 disposed therebetween. Each end of angle iron 285 is then coupled by a pair of coupling members 245 to one support tubular 220 with one support member 280 and skin 260 disposed therebetween, as illustrated. Each coupling member 245 extends from the exterior of auto lock box 100 through tubular member 220, skin 260, support member 280 proximate its lower end, and angle iron 285, and is secured in position by a fastening device which is only accessible from the interior of auto lock box 100.

The upper end of support member 280 is similarly coupled to support tubular 220 with skin 260 disposed therebetween. As previously described, an extension 215 of adapter plate 210 of roof 180 is inserted within the upper end of each support tubular 220. A coupling member 245 extends from the exterior of auto lock box 100 through support tubular 220, extension 215 of adaptor plate 210 inserted therein, skin 260, and support member 280, and is secured in position by a fastening device which is only accessible from the interior of auto lock box 100. Because the fastening device of each coupling member 245 is accessible only from the interior of auto lock box 100, coupling members 245 may not be decoupled from the exterior of auto lock box 100 to expose at least some portion of opening 275 and thereby permit unauthorized entry therethrough into auto lock box 100.

Figure 4:
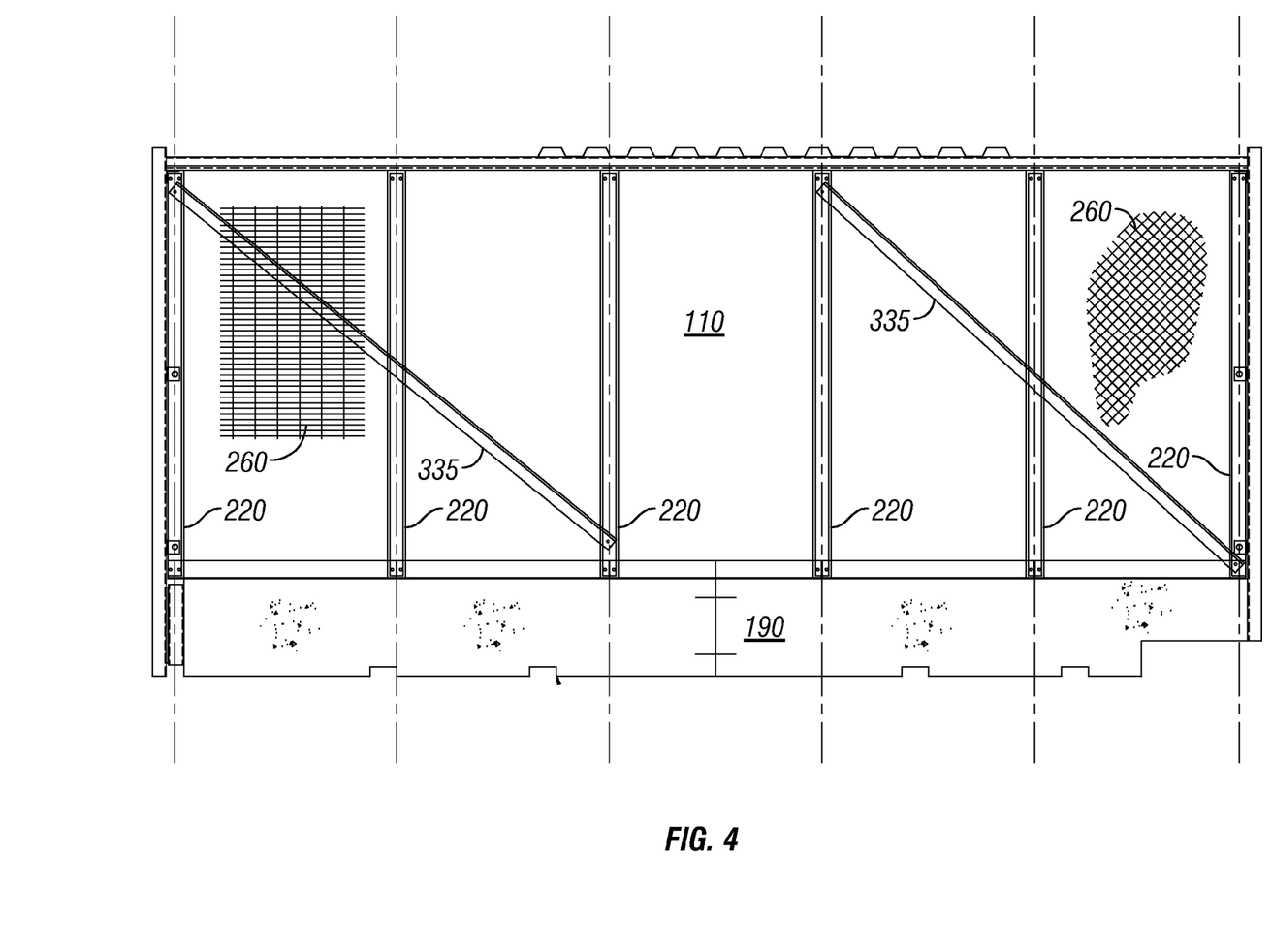
FIG. 4 is a side view of the auto lock box, showing optional bracing which may be coupled to the auto lock box to increases its capacity to withstand wind loads.

Turning briefly to FIG. 4, sidewall 110 may farther include one or more bracing members 335 to increase the ability of auto lock box 100 to resist wind loads. Each bracing member 335 extends across two or more support tubulars 220 and is coupled thereto by a plurality of coupling members 245. In some embodiments, each bracing member 335 extends diagonally from the upper end of a first support tubular 220 across a second support tubular 220 to the lower end of a third support tubular 220, as shown. In other embodiments, bracing members 335 may extend horizontally or at different angles across the support tubulars 220. Further, bracing members 335 may be configured such that auto lock box 100 is able to resist winds as high as 150 mph.

Returning to FIG. 3, roof 180 further includes a ribbed roof deck 305 and two angle irons 300. Adaptor plate 210 includes two lips 310, both extending the full length of adaptor plate 210. One angle iron 300 is coupled to exterior lip 310 via a plurality of coupling members 245 to promote stiffening of roof 180. The other angle iron 300 is coupled to interior lip 310 of adaptor plate 210, also via a plurality of coupling members 245, to provide stiffening of adaptor plate 210 and to enable coupling of ribbed roof deck 305 to adaptor plate 210. As illustrated, roof deck 305 is coupled to adaptor plate 210 by a plurality of coupling members 245 extending between an edge 315 of roof deck 305, angle iron 300, and interior lip 310 of adaptor plate 210. The opposite edge of roof deck 305 is similarly coupled to a second adaptor plate 210 positioned between two additional angle irons 300 and connected to the other sidewall 110, as shown in FIG. 6.

Figure 5:
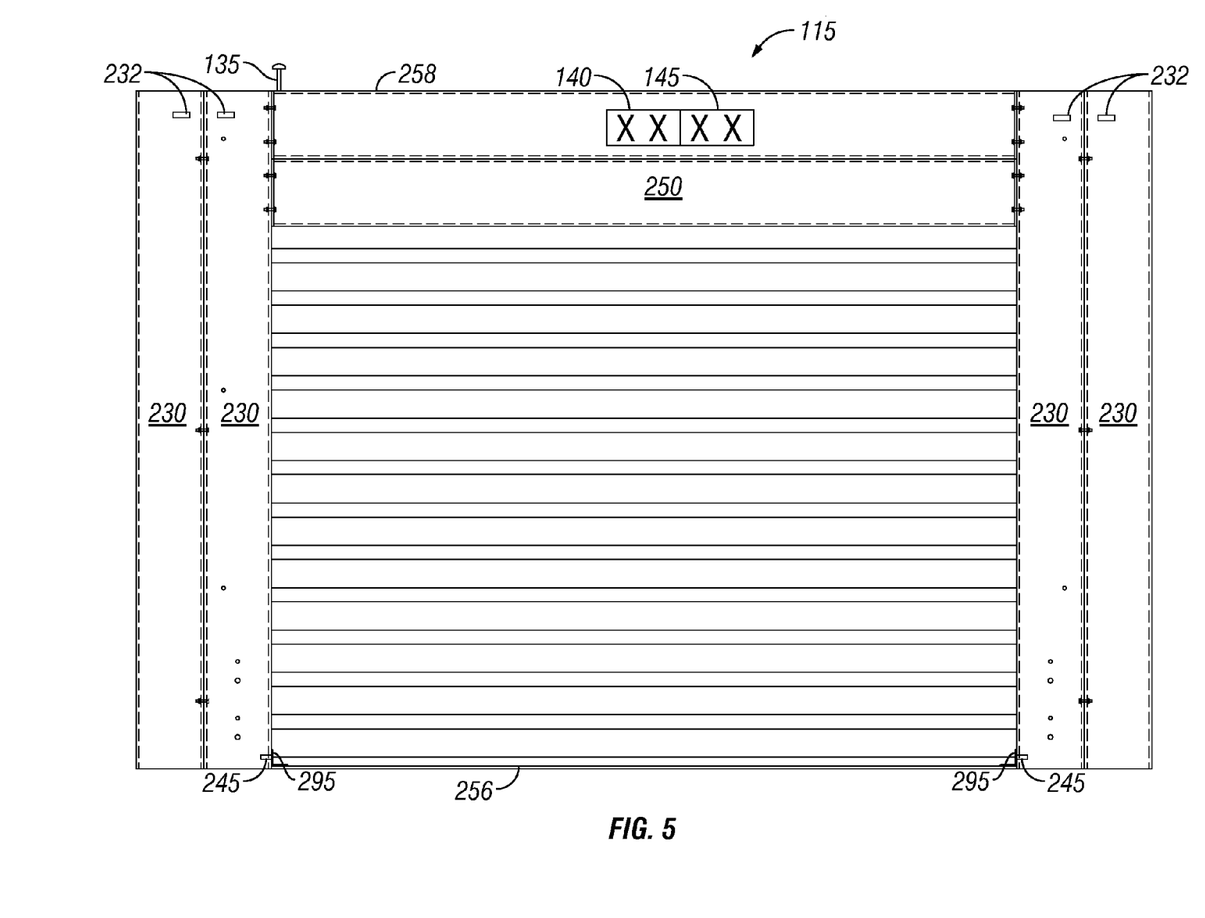
FIG. 5 is an exterior front view of the auto lock box.

Still referring to FIG. 3, auto lock box 100 includes four pairs 240 of channel plates 230, two pairs 240 forming a portion of entry 115 and two pairs 240 (only one is shown in FIG. 3, while both are visible in FIG. 6) forming a portion of rear wall 175. Referring to entry 115, a laterally extending stiffening plate 250 is coupled between pairs 240 of channel plates 230 by a plurality of coupling members 245. Stiffening plate 250 and the two pairs 240 of channel plates 230 coupled thereto form a frame 258 of entry 115 with an opening 340 therethrough. Turning briefly to FIG. 5, auto lock box 100 farther includes a stiffening plate, or strut, 256 extending laterally between the innermost channel plates 230 of frame 258 proximate the base of entry 115. Strut 256 is coupled at each end to one of the innermost channel plates 230 by an angle clip 295 and coupling member 245. As will be described below, entry 115 further includes a rolling door, which can be lowered to cover opening 340 between frame 258, as shown, and subsequently retracted. Strut 256 is configured to provide sufficient stiffness that the innermost channel plates 230 of frame 258 remain substantially normal to stiffening plate 250 extending therebetween. This enables the rolling door to be smoothly and repeatedly lowered over and retracted from opening 340. In some embodiments, strut 256 is 1½ inch in height and three inches in width.

Figure 6:
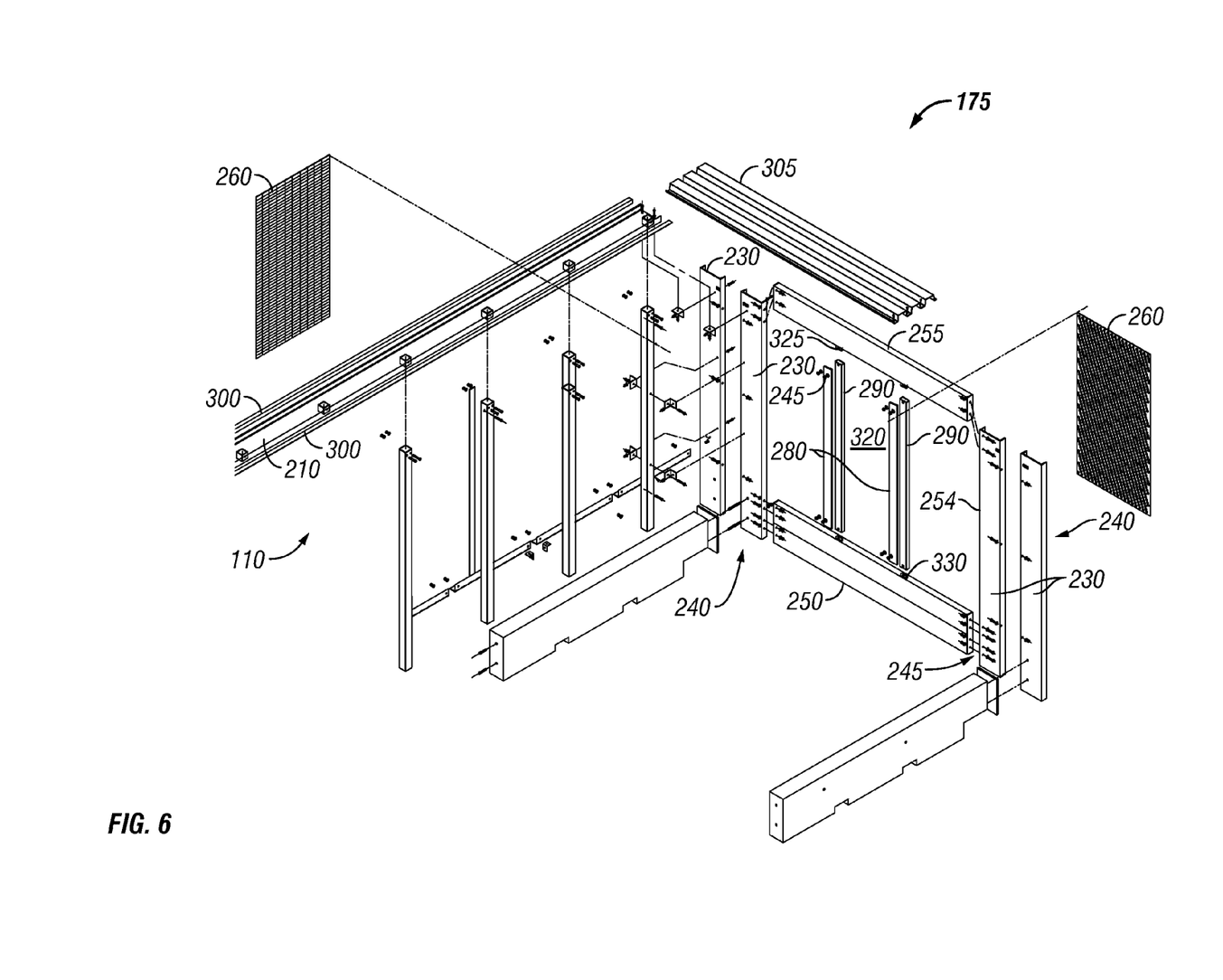
FIG. 6 is an exploded view of the rear wall and another sidewall of the auto lock box.

Turning to FIG. 6, rear wall 175 includes a similar stiffening plate 250 at its base and another stiffening plate 255 proximate roof 180, each plate 250, 255 extending laterally between two pairs 240 of channel plates 230 and coupled thereto by a plurality of coupling members 245. Stiffening plates 250, 255 and the two pairs 240 of channel plates 230 coupled thereto form a frame 254 of rear wall 175 with an opening 320 extending therebetween.

Rear wall 175 further includes skin 260, described above, that extends across opening 320 to complete rear wall 175 and prevent unauthorized entry therethrough. Because there are no support tubulars 220 extending within frame 254 of rear wall 175, two vertically extending tubular attachment members 290 are instead coupled between stiffening plates 250, 255 to enable coupling of skin 260 to frame 254. In some embodiments, attachment members 290 are tubular in nature, each having ends which receive therein an extension 325 coupled to and extending downward from stiffening plate 255 and an extension 330 coupled to and extending upward from stiffening plate 250.

To cover opening 320, skin 260 is positioned against the interior surfaces of attachment members 290. One support member 280 is then positioned against each attachment member 290 with skin 260 disposed therebetween and secured in position by two coupling members 245 at each end. Each coupling member 245 extends from the exterior of auto lock box 100 through attachment member 290, skin 260, and support member 280, and is secured in position by a fastening device which is only accessible from the interior of auto lock box 100. Because the fastening device of each coupling member 245 is accessible only from the interior of auto lock box 100, coupling members 245 may not be decoupled from the exterior of auto lock box 100 to expose at least some portion of opening 320 and permit unauthorized entry therethrough to auto lock box 100.

Figure 7A:
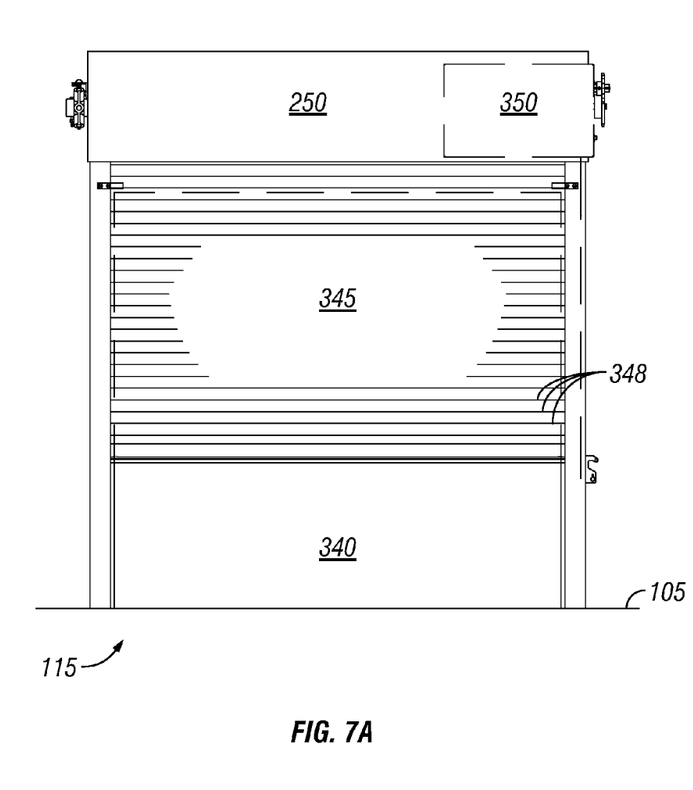
FIGS. 7A and 7B are interior front and side views, respectively, of the auto lock box.
Figure 7B:
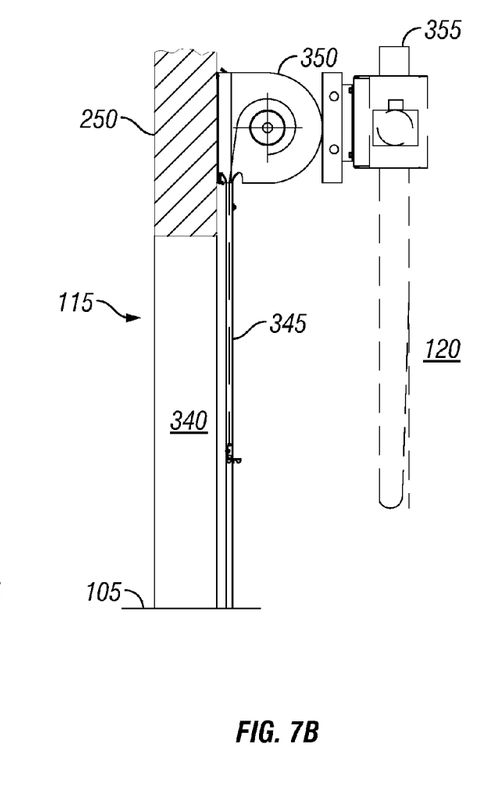

Lastly, auto lock box 100 includes a rolling door 345 and a drive mechanism 350 coupled thereto, both shown in FIGS. 7A and 7B. As previously mentioned, rolling door 345 is extendable to cover opening 340 of entry 115, thereby preventing access to enclosure 120, and retractable to provide access into enclosure 120 through opening 340. Further, rolling door 345 includes a plurality of slats or panels 348 between which air and light may pass, thereby promoting the security and ventilation of auto lock box 100.

Drive mechanism 350 is coupled to rolling door 345 and electrically coupled to EAS 135 (FIG. 1). When an electric signal is received from EAS 135, drive mechanism 350 is actuated to retract rolling door 345 if extended and to extend rolling door 345 if retracted. Thus, entry 115 is opened and closed, as desired, to limit or control access to auto lock box 100. In some embodiments, auto lock box 100 farther includes a backup power supply 355, such as a battery. Backup power supply 355 is mounted on drive mechanism 350 to provide power to drive mechanism 350 in the event electricity cannot be provided from electrical panel 174, as previously described. Further, drive mechanism 350 is mounted to and supported by stiffening plate 250 of entry 115 within enclosure 120. As such, drive mechanism 350 is inaccessible from the exterior of auto lock box 100 and cannot be tampered with to force rolling door 345 to raise and enable unauthorized entry into lock box 100.

Lock box 100 described above is configured to secure a car, such as vehicle 125, parked therein. In other embodiments, the lock box is configured to secure other types of vehicles or equipment, such as that commonly found at construction sites. For example, turning to FIG. 8, another lock box in accordance with the principles disclosed herein is shown. Unlike auto lock box 100 described above, lock box 400 is configured to secure a truck, such as truck 425, parked therein. To accommodate the dimensions of truck 425, truck lock box 400 is taller and/or longer than auto lock box 100. As a consequence, truck lock box 400 has some design differences, relative to auto lock box 100, which enable its taller and/or longer structure. Aside from those differences, which are described below, the design, assembly, and operation of truck lock box 400 are substantially the same as described above with respect to auto lock box 100 and will not be repeated below for the sake of brevity.

Figure 8:
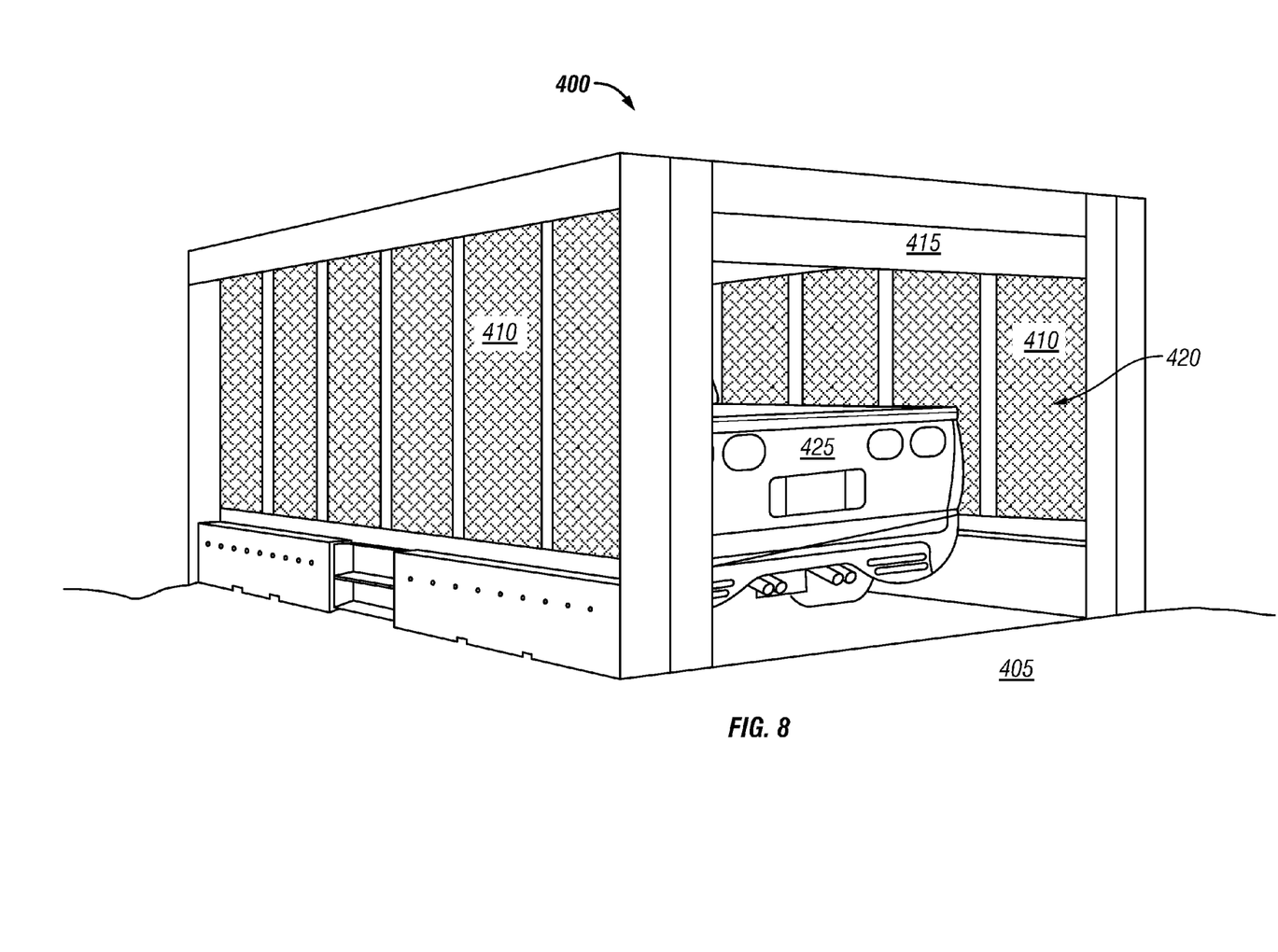
FIG. 8 is a perspective view of a schematic representation of another vehicle lock box in accordance with the principles disclosed herein.
Figure 9:
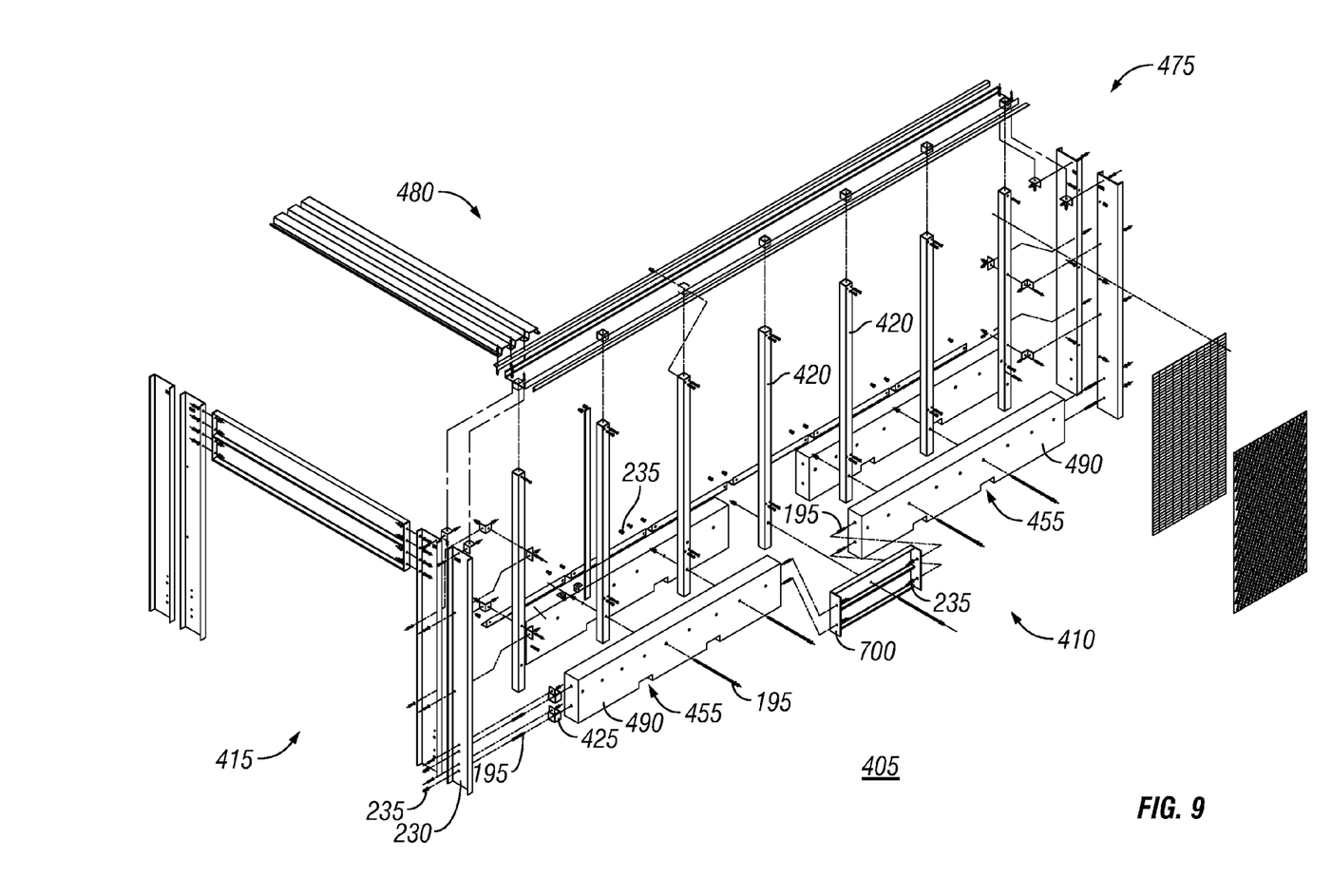
FIG. 9 is an exploded view of the entry and a sidewall of the truck lock box.

To provide a frame of reference for further description, truck lock box 400 includes two sidewalls 410, an entry 415, rear wall 475 (FIG. 9), and roof 480 (FIG. 9). Sidewalls 410, entry 415, rear wall 475, and roof 480 form an enclosure 420 over a driveway 405, or other surface, configured to receive and enclose track 425 therein. Entry 415 is remotely actuatable to open, thereby enabling truck 425 to enter enclosure 420, as illustrated, and to subsequently close, thereby securing truck 425 within enclosure 420.

Referring next to FIG. 9, an exploded assembly view of one sidewall 410, entry 415, and roof 480 of truck lock box 400 is shown. The primary difference between truck lock box 400 and auto lock box 100 is the construction of its sidewalls 410 and to a lesser degree, the coupling of sidewalls 410 to entry 415 and to rear wall 475. Even so, construction of each sidewall 410 and its coupling to entry 415, rear wall 475, and roof 480 are substantially identical. Thus, the following description, which is directed to the sidewall 410 depicted in FIG. 9, applies equally to the other sidewall 410, which is not shown in FIG. 9.

The base of sidewall 410 is formed by four pre-cast concrete blocks 490 and a spacer member 700. Blocks 490 are rectangular in shape, and provide stability and ballast to truck lock box 400. Each block 490 includes one or more features 455 that enable lifting of truck lock box 400. In this embodiment, each feature 455 is an opening along the base of a sidewall 410 configured to receive the fork of a fork lift. Further, features 455 enable water, such as rain water or melted snow, to pass therethrough to prevent its buildup within truck lock box 400.

Two of the four blocks 490 are positioned end-to-end with spacer member 700 disposed therebetween. Each end of spacer member 700 is coupled to the adjacent block 490 by two tensile rods 195 and two fastening means 235 coupled thereto. The two remaining blocks 490 are positioned inward of the first two blocks 490 with a plurality of vertically extending support tubulars 420 disposed therebetween. Each support tubular 420 extends vertically upward from the surface of driveway 405 upon which truck lock box 400 is positioned. Further, each support tubular 420 is coupled to the adjacent blocks 490 by a tensile rod 195 inserted through both blocks and support tubular 420 and a fastening means 235 coupled thereto. Support tubulars 420 support the weight of roof 480, the mechanical mechanism that opens and closes entry 415, and the remaining components of sidewalls 410 coupled thereto. Blocks 490, in turn, provide support to tubulars 420 disposed therebetween.

Finally, two face plates 425 are disposed between the free end of each block 190 and a vertically extending channel plate 230. Channel plate 230 is coupled to block 190 with each face plate 425 positioned therebetween by a tensile rod 190 and a fastening means 235 coupled thereto. Channel plate 230 is also coupled to the face plate 425 by a coupling member 245 extending therebetween. Aside from the structural or design differences of sidewalls 410 described above and dimensional differences to accommodate truck 425, which is longer and/or taller than car 125 (FIG. 1), the remainder of truck lock box 400 is substantially the same as auto lock box 100, in design, assembly, and operation.

Figure 10A:
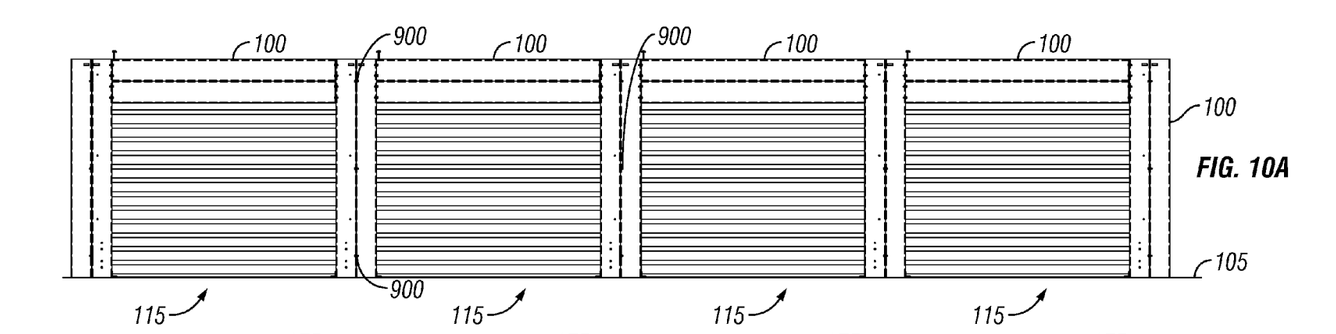
FIGS. 10A and 10B are front and plane views, respectively, of four auto lock boxes installed in an aligned arrangement.
Figure 10B:
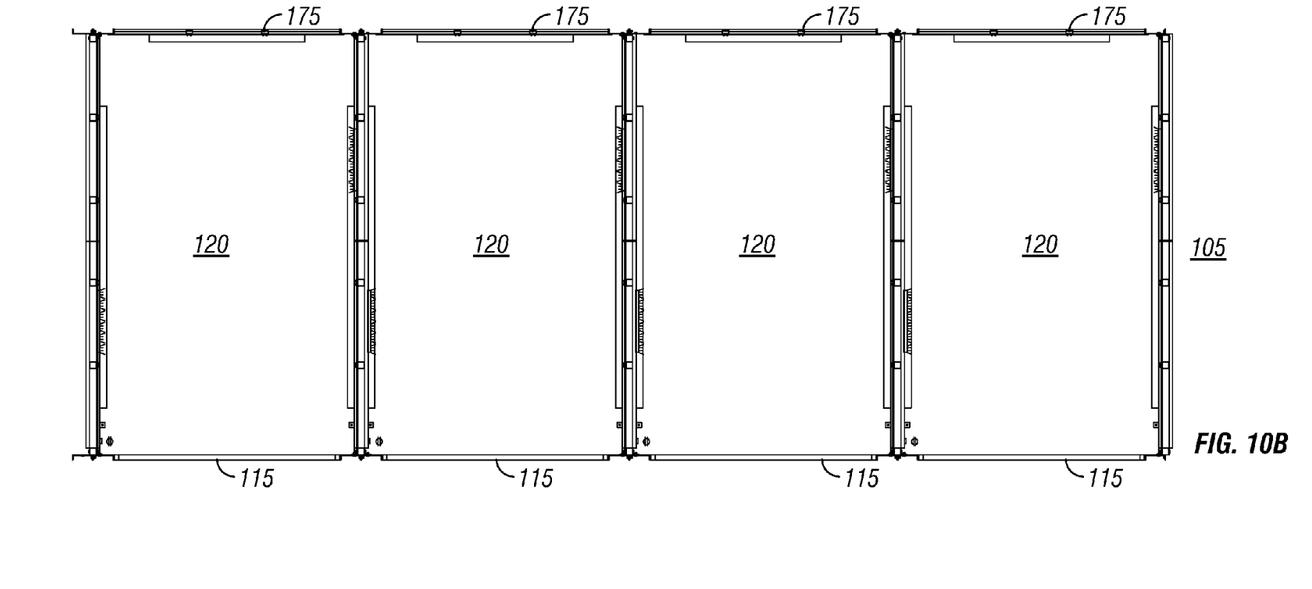

A plurality of auto lock boxes 100 and/or truck lock boxes 400 may be positioned within a parking lot, such as parking lot 105 (FIG. 1) or other installation site, to enable multiple users to each secure their own vehicle independently of the other secured vehicles. When so installed, the auto lock boxes 100, for example, may be positioned side by side and aligned, as shown in FIGS. 10A and 10B, which are front and plan views, respectively, of the aligned auto lock boxes 100. Although these figures illustrate multiple aligned auto lock boxes 100, multiple truck lock boxes 400 may be similarly positioned. Thus, the following description applies equally to both scenarios.

Each pair of adjacent auto lock boxes 100 is coupled by a plurality of shims 900 extending therebetween to prevent their relative movement due to environmental loads and impact loads. Shims 900 also accommodate for the typically uneven surface of parking lot 105 upon which auto lock boxes 100 may be installed. In the event that one auto lock box 100 is somewhat elevated relative to the adjacent lock box 100, shims 900 coupled therebetween flex, twist, and/or bend to accommodate elevational differences. Were adjacent lock boxes 100 directly coupled in the absence of shims 900, such elevational differences could cause increased, if not excessive, stresses to auto lock boxes 100 at their coupling locations and damage over time. Also, by enabling shims 900 to deform in response elevational differences rather than deforming auto lock boxes 100 themselves, the installed shape of frame 258 of entry 115 of each auto lock box 100 can be maintained to enable rolling door 340 to be smoothly extended and retracted, as desired.

Figure 11A:
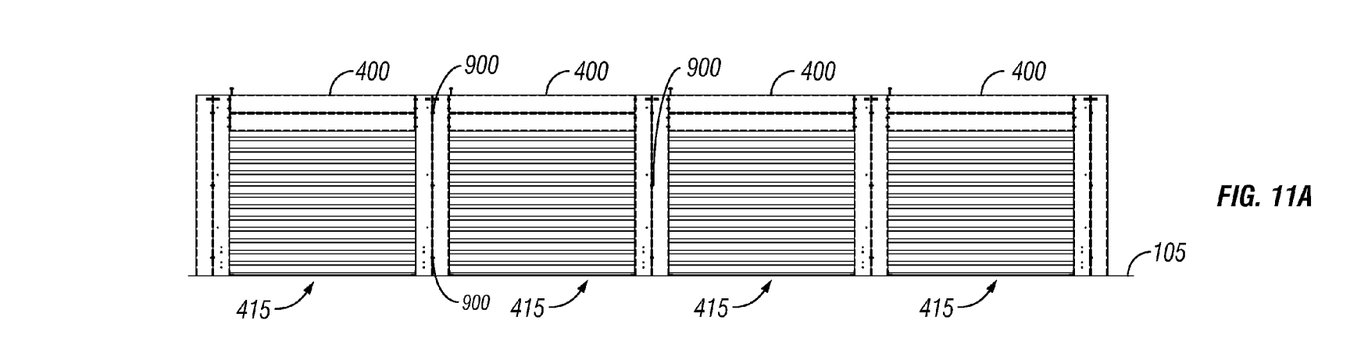
FIGS. 11A and 11B are front and plane views, respectively, of four truck lock boxes installed in a staggered arrangement.
Figure 11B:
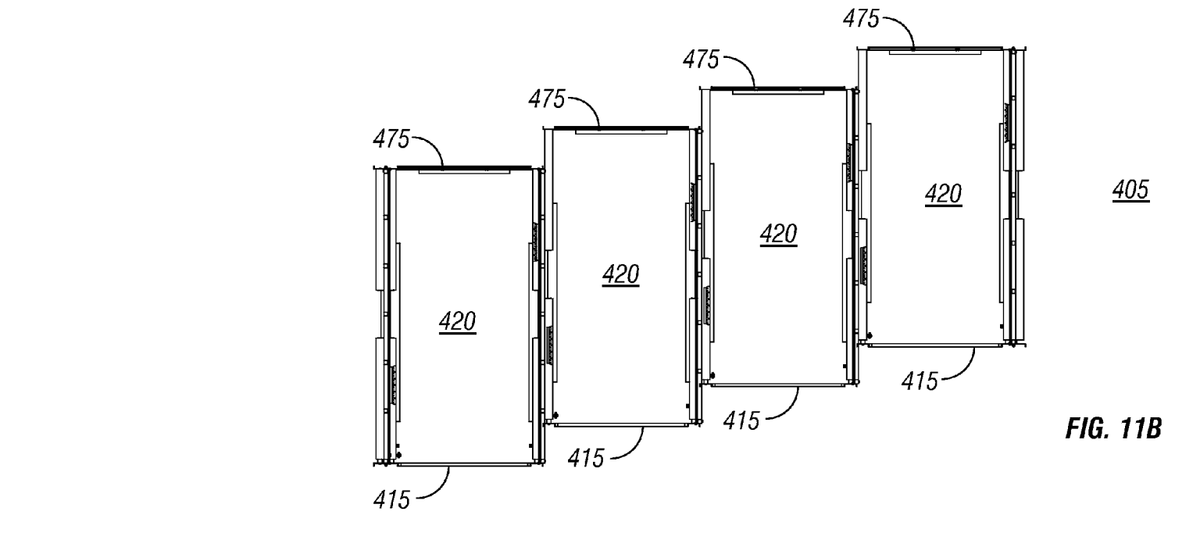

Alternatively, auto lock boxes 100 or truck lock boxes 400 may be installed side-by-side but staggered relative to each other, rather than aligned. For example, FIGS. 11A and 11B depict four truck lock boxes 400 installed side-by-side in a staggered arrangement. As in the aligned arrangement described above, adjacent truck lock boxes 400 are coupled by a plurality of shims 900 extending therebetween to prevent their relative movement and to accommodate their elevational differences, if any, due to uneven parking lot 105 upon which truck lock boxes 400 are positioned.

While various preferred embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A system for securing a vehicle, the system comprising:
an enclosure formed by a multi-walled structure positioned on a parking surface and configured to receive a vehicle therein, the enclosure having a closeable opening through which the vehicle is accessible;
an enclosure identifier;
an attendant system remotely located from the enclosure and configured to control access to the vehicle through the opening, wherein the attendant system is further configured to receive user information to authorize a user and identify the authorized user with the enclosure identifier; and
an electronic actuation system configured to receive an activation signal from the remotely located attendant system and to deliver an actuation signal based on input from the authorized user, whereby the opening is covered or exposed;
wherein while the authorized user is authorized to access the enclosure, the enclosure is not available to other users.

2. The system of claim 1, wherein the authorized user is an individual.

3. The system of claim 2, wherein the enclosure identifier is unique to the enclosure.

4. The system of claim 2, wherein the individual authorized user controls access to the enclosure.

5. The system of claim 1, further comprising:
a door that is extendable to cover the opening and retractable to expose the opening; and
a drive mechanism coupled to the door, the drive mechanism configured to receive the actuation signal and to extend or retract the door upon receipt of the actuation signal.

6. The system of claim 5, wherein the drive mechanism is mounted within the enclosure and inaccessible from outside of the enclosure.

7. The system of claim 1, wherein the attendant system comprises:
an attendant configured to receive a request for access to the enclosure; and
a transmitter for generating the activation signal.

8. The system of claim 7, wherein the attendant is an automated system.

9. The system of claim 8, wherein the transmitter is coupled to the automated system.

10. The system of claim 1, wherein the multi-walled structure includes at least one wall comprising a skin coupled to a frame by coupling members having fasteners accessible only from inside of the enclosure.

11. A system for securing a vehicle, the system comprising:
an enclosure formed by a multi-walled structure positioned on a parking surface and configured to receive a vehicle therein, the enclosure having a closeable opening through which the vehicle is accessible;
an enclosure identifier;
an attendant system remotely located from the enclosure and configured to control access to the vehicle through the opening; and
an electronic actuation system configured to receive an activation signal from the remotely located attendant system and to deliver an actuation signal, whereby the opening is covered or exposed;
wherein the attendant system is configured to verify the enclosure is empty before receiving information from a user to authorize the user and identify the authorized user with the enclosure identifier;
wherein the electronic actuation system is configured to deliver the actuation signal based on input from the authorized user.

12. The system of claim 11, wherein the authorized user is an individual and the individual authorized user controls access to the enclosure.

13. The system of claim 11, wherein the attendant system comprises:
an attendant configured to receive a request for access to the enclosure; and
a transmitter for generating the activation signal.

14. The system of claim 13, wherein the attendant is an automated system.

* * * * *